United States Patent
Doi et al.

(10) Patent No.: US 6,268,024 B1
(45) Date of Patent: Jul. 31, 2001

(54) PROCESS FOR PRODUCING MAGNETIC RECORDING MEDIUM

(75) Inventors: Takanori Doi, Hatsukaichi; Kousaku Tamari; Yasuo Kakihara, both of Hiroshima; Kenichi Nakata, Otake; Mitsuru Matsuura; Setsuo Yamamoto, both of Ube, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/276,520

(22) Filed: Mar. 25, 1999

(30) Foreign Application Priority Data

Mar. 26, 1998 (JP) ................................. 10-100137

(51) Int. Cl.$^7$ .............................. H05H 1/00; B05D 5/12; B05D 3/12; B05D 3/10; G11B 5/66
(52) U.S. Cl. ......................... 427/537; 427/539; 427/129; 427/131; 427/132; 427/322; 427/337; 428/694 TS
(58) Field of Search ........................... 428/65.3, 694 TS, 428/694 T, 900; 427/129, 131, 132, 537, 539, 322, 337

(56) References Cited

U.S. PATENT DOCUMENTS 4,557,944 * 12/1985 Arai et al. ............................ 427/537
5,496,631 * 3/1996 Tamari ................................. 428/332
5,589,261 * 12/1996 Tamari ................................. 428/332
5,628,953 * 5/1997 Tamari ................................. 264/346
5,851,582 * 12/1998 Tamari et al. ....................... 427/130

FOREIGN PATENT DOCUMENTS 0 586 142 A1   3/1994  (EP) .
0 673 021 A1   9/1995  (EP) .
0 910 068 A1   4/1999  (EP) .

* cited by examiner

*Primary Examiner*—Paul Thibodeau
*Assistant Examiner*—Holly C. Rickman
(74) *Attorney, Agent, or Firm*—Nixon & Vanderhye

(57) ABSTRACT

A magnetic recording medium is prepared by forming on a plastic substrate, a nickel oxide underlayer having a plane (200) which is predominantly oriented in parallel with the surface of the plastic substrate, then forming on the nickel oxide underlayer at a substrate temperature of less 240° C., a cobalt-containing magnetite thin film having a plane (400) which is predominantly oriented in parallel with the surface of the plastic substrate, and finally oxidizing the cobalt-containing magnetite thin film in a plasma-activated oxygen atmosphere containing a rare gas at a substrate temperature of less than 240° C. while incorporating the rare gas into oxygen. This results in a cobalt-containing maghemite thin film as a perpendicular magnetic film having a spacing of a plane (400) of not more than 2.082 Å. The magnetic recording medium so produced is useful for high-density recording using a plastic substrate.

4 Claims, No Drawings

PROCESS FOR PRODUCING MAGNETIC RECORDING MEDIUM

BACKGROUND OF THE INVENTION

The present invention relates to a process for producing a magnetic recording medium, and more particularly, to a process for producing a magnetic recording medium comprising a perpendicular magnetic film whose coercive force value is controllable over a wide range, which is excellent in oxidation resistance and corrosion resistance, and has a large squareness (value corrected as to demagnetizing field) and a high coercive force even when the cobalt content is as low as possible, in industrially and economically advantageous manner.

In recent years, there has been a remarkable tendency that information devices or systems are miniaturized and required to have a high reliability, and there has been an increasing demand for providing magnetic recording media capable of high-density recording. As magnetic recording media which can satisfy these requirements, there has been extensively developed perpendicular magnetic films. This is because such perpendicular magnetic films are free from demagnetization since these films are magnetized in the direction perpendicular to the surface thereof, thereby enabling high-density recording thereon.

Conventionally, as the perpendicular magnetic films, there have been proposed alloy films such as Co—Cr alloy film or the like. However, in order to prevent these alloy films from being deteriorated in magnetic properties due to the oxidation, it has been required to coat the surface thereof with a carbon film having a thickness of about 100 to about 200 Å, so that the loss due to the magnetic spacing (distance between a magnetic head and the magnetic recording layer) increases by the thickness of the carbon film, resulting in incompetence of high-density recording. For this reason, there has been a strongly demand for providing perpendicular magnetic films composed of oxides having a good oxidation stability.

Further, since it is necessary that the magnetic recording medium has a reproduced output as large as possible upon high-density recording, the perpendicular magnetic film used therefor is required to exhibit a squareness as large as possible. In addition, the coercive force of the perpendicular magnetic film is strongly required to be freely controllable over a wide range, especially 1,000 to 10,000 Oe.

More specifically, in order to carry out a magnetic saturation recording using current magnetic heads, the coercive force of the perpendicular magnetic film is strongly required to be about 1,000 to about 3,000 Oe. It is known that the coercive force Hc of magnetic recording medium and the writing ability of magnetic head have a close relationship to each other, and that when the coercive force Hc of the magnetic recording medium is too high, e.g., more than 3,000 Oe, the write current becomes higher, so that the current extensively used magnetic head fails to magnetize the magnetic recording medium to a sufficient extent because of a low saturation magnetic flux density Bm.

On the other hand, in order to provide a magnetic recording medium having a higher recording density, it has been strongly required that the coercive force value thereof is as high as possible, especially about 3,000 to about 10,000 Oe.

Conventionally, as the perpendicular magnetic films for magnetic recording, there have been proposed alloy films such as Co—Cr alloy film or Co—Pt alloy film, spinel-type iron oxide thin films such as cobalt-containing maghemite film (Japanese Patent Application Laid-Open (KOKAI) Nos. 51-119999(1976), 63-47359(1988), 3-17813(1991), 3-188604(1991), 4-10509(1992) and 5-12765(1993)), and magneto-plumbite-type iron oxide thin films such as barium ferrite film (Japanese Patent Application Laid-Open (KOKAI) No. 62-267949(1976)), or the like.

Among these perpendicular magnetic films, the cobalt-containing maghemite films which are most typical spinel-type iron oxide films, are excellent in oxidation resistance and corrosion resistance since maghemite is the iron oxide, resulting in excellent stability independent of change in passage of time and less change in magnetic properties with passage of time. Further, because of large crystal magnetic anisotropy, the cobalt-containing maghemite films are expected to be applied to perpendicular magnetic recording media.

The coercive force of the above-mentioned cobalt-containing maghemite thin films, becomes high with the increase of cobalt content thereof, while with the increase of cobalt content, the stability independent of change in passage of time thereof tends to be deteriorated by adverse influences of heat or the like. Therefore, it has been strongly required that the coercive force value is as high as possible even when the cobalt content is low.

Meanwhile, the cobalt-containing maghemite film has been produced on a substrate by a sputtering method or the like. The production process generally requires a temperature as high as not less than about 240° C. As a result, there arises a problem that only aluminum discs, aluminum alloy discs or the like which can withstand a temperature as high as not less than 240° C., are usable in the process. The conventional production processes in which the temperature as high as not less than 240° C. is required, have such a problem that it becomes difficult to produce the cobalt-containing maghemite film in industrially and economically useful manner.

In recent years, in order to enhance a crystalline orientation property of the perpendicular magnetic films, it has been attempted to use a single-crystal substrate and to form various underlayers between the perpendicular magnetic film and the substrate. For example, there have been proposed a substrate composed of a MgO single crystal ("IEEE Trans. Mag.", MAG-12, No. 6, 733(1976), "IEEE Trans. Mag.", MAG-14, No. 5, 906(1978) and Czehch. "J. Phys.", B21, 563(1971)); a substrate composed of NaCl ("J. Cry. Growth", 50, 801(1980)); an underlayer composed of N o,(Japanese Patent Application Laid-Open (KOKAI) No. 5-166167(1993) and European Patent No. 0586142 A) or the like.

In the case of the sputtering method more frequently adopted among the above-mentioned conventional methods of producing a cobalt-containing maghemite thin film, there is caused such a disadvantage that although a magnetic easy axis of the cobalt-containing maghemite thin film is usually an axis <100>, the maghemite tends to be randomly oriented or the plane (111) thereof tends to be oriented in parallel with the substrate, so that it is difficult to produce a perpendicular magnetic film. As the method of producing a cobalt-containing maghemite film whose (400) plane is predominantly oriented in parallel with the substrate, there are known, for example, (a) a method described in "Lecture Abstracts of 9th Meeting of Japan Institute of Applied Magnetics", 29PB-10, (b) a method described in "Lecture Abstracts of 13th Meeting of Japan Institute of Applied Magnetics", p. 246, (c) a method described in Japanese Patent Application Laid-Open (KOKAI) No. 4-10509 (1992), and (d) a method described in Japanese Patent Application Laid-Open (KOKAI) No. $_7$-307022(1995).

In the method (a), Fe and Co are ionized in an oxygen plasma and then deposited on an $MgAl_2O_4$ substrate or a silica glass substrate which are heated to 500° C. Thus, it is required to maintain the substrate at a temperature as high as not less than 500° C. in vacuum during the film formation, resulting in poor productivity. In addition, since the substrate temperature is thus raised to not less than 500° C., the substrate itself is required to show a good heat resistance. However, currently used materials for substrates of magnetic recording media such as glass, are insufficient in heat resistance at a high temperature of 500° C. Accordingly, there are caused industrial and economical disadvantages that materials usable for the substrate are restricted.

The method (b) is a so-called plasma-excitation MO-CVD method in which the substrate is required to be maintained at a temperature as high as 300 to 400° C. in vacuum during film formation process. For this reason, the method (b) is deteriorated in productivity and, therefore, industrially and economically disadvantageous.

In the method (c), after forming a multi-layered metal film composed of two or more Co layer(s) and Fe layer(s), the multi-layered metal film is heat-treated at not less than 500° C. in an atmosphere containing oxygen. As described above, since it is necessary to conduct the method at such a high temperature, materials usable for the substrate are restricted, resulting in industrial and economical disadvantages.

In the method (d), a single-layered film composed of cobalt-containing magnetite whose (400) plane is predominantly oriented in parallel with the surface of substrate, or a multi-layered film composed of magnetite layer and CoO layer (in both films, in which the molar ratio of Co to Fe is not less than 0.01 and less than 0.10 is formed on an NiO underlayer which is formed on the substrate and whose (200) plane is predominantly oriented in parallel with the surface of the substrate, and then heat-treated at a temperature of 240 to 450° C., thereby producing a cobalt-containing maghemite perpendicular magnetic film having a spacing of a plane (400) of not more than 2.082 Å. However, since the production method still requires a temperature as high as not less than 240° C., materials usable for the substrate are restricted, resulting in industrial and economical disadvantages. Further, in the method (d), the effect of obtaining a coercive force value as high as possible even when the cobalt content is low, cannot be achieved.

In the case where the afore-mentioned known substrate composed of MgO single crystal or NaCl is used, the plane (400) of the cobalt-containing maghemite thin film as a perpendicular magnetic film can be readily produced. However, the single-crystal substrate is not only expensive but also brittle, so that it is practically difficult to produce a large-area substrate therefrom.

From this point of view, the (200)-oriented NiO film can be practically used as an underlayer because the film can be readily produced on a glass substrate at room temperature by a sputtering method. However, in the case of the perpendicular magnetic film described in Japanese Patent Application Laid-Open (KOKAI) No. 5-166167(1993), although the crystal orientation of the plane (400) of a cobalt ferrite is accelerated by forming on the NiO underfilm, there arises such a problem that a compression stress is disadvantageously caused within the magnetic film because the spacing of plane (200): 2.09 Å of the NiO underfilm is less than the spacing of plane (400): 2.10 Å of $Co_xFe_{3-x}O_4$, thereby decreasing a perpendicular anisotropy.

This fact is apparently recognized from such a phenomenon that when the lattice constant of the underlayer is larger than that of the ferrite layer, the perpendicular magnetic anisotropy of the ferrite layer become larger, as described in Japanese Patent Application Laid-Open (KOKAI) No. 3-17813(1995).

Further, in European Patent Application Laid-Open No. 0586142, there is described a perpendicular magnetic film consisting essentially of a cobalt-containing maghemite thin film whose (400) plane is predominantly oriented in parallel with the surface of a substrate, and which is formed on an NiO underlayer whose (100) plane is predominantly oriented in parallel with the surface of the. The perpendicular magnetic film contains cobalt at a ratio of Co to Fe of 0.10:1 to 0.32:1, and has a spacing of plane (400) of not more than 2.085 Å and a coercive force of not less than 4,000 Oe. In the production process, it is required to conduct a heat-treatment at a temperature as high as 280 to 450° C., resulting in deteriorated productivity and, therefore, causing industrial and economical disadvantages.

It has been strongly demanded to provide a process for producing a perpendicular magnetic film which is excellent in oxidation resistance, and corrosion resistance and exhibits a large squareness (value corrected as to demagnetizing field) and a coercive force as high as possible even when the cobalt content is low, and whose coercive force is controllable over a wide range, in industrially and economically advantageous manner. However, there has not been provided yet such a method of producing the perpendicular magnetic film having all of the above-mentioned properties.

As a result of the present inventors' earnest studies, it has been found that by forming on the plastic substrate, the nickel oxide underlayer having a plane (200) which is predominantly oriented in parallel with the surface of the plastic substrate; forming on the nickel oxide underlayer, the cobalt-containing magnetite thin film having a plane (400) which is predominantly oriented in parallel with the surface of the plastic substrate, at a substrate temperature of not less 240° C.; and oxidizing the obtained cobalt-containing magnetite thin film in a plasma-activated oxygen atmosphere containing a rare gas at a substrate temperature of less than 240° C., a magnetic recording medium comprising a perpendicular magnetic film composed of spinel-type iron oxide, whose coercive force value is controllable over a wide range, which is excellent in oxidation resistance or corrosion resistance and has a large squareness (value corrected as to demagnetizing field) and a high coercive force even when the cobalt content is as low as possible, can be produced at a temperature as low as less than 240° C. in industrially and economically advantageous manner. The present invention has been attained on the basis of the finding.

SUMMARY OF THE INVENTION

It is an object of the present invention to provide a process for producing a magnetic recording medium comprising a perpendicular magnetic film composed of spinel-type iron oxide, which is excellent in oxidation resistance or corrosion resistance and has a large squareness (value corrected as to demagnetizing field) and a high coercive force even when the cobalt content is as low as possible, and whose coercive force value is controllable over a wide range, at a substrate temperature as low as less than 240° C. in industrially and economically advantageous manner.

To accomplish the aims, in a first aspect of the present invention, there is provided a process for producing a magnetic recording medium, comprising:

forming on a plastic substrate, a nickel oxide underlayer having a plane (200) which is predominantly oriented in parallel with the surface of the plastic substrate;

forming on the nickel oxide underlayer, a cobalt-containing magnetite thin film having a plane (400) which is predominantly oriented in parallel with the surface of the plastic substrate, at a substrate temperature of less 240° C.; and oxidizing the obtained cobalt-containing magnetite thin film in a plasma-activated oxygen atmosphere containing a rare gas at a substrate temperature of less than 240° C., thereby producing a cobalt-containing maghemite thin film as a perpendicular magnetic film having a spacing of a plane (400) of not more than 2.082Å.

DETAILED DESCRIPTION OF THE INVENTION

First, the process for producing a magnetic recording medium according to the present invention is described.

The magnetic recording medium obtained in the process according to the present invention comprises a plastic substrate, a nickel oxide underlayer formed on the substrate and a cobalt-containing maghemite thin film formed on the nickel oxide underlayer.

The plastic substrate used in the present invention may be composed of resins having a thermal deformation temperature of not more than 240° C. Examples of the resins may include so-called heat-resistant resins such as polyimides, polysulfones, polyarylates, polyphenylene sulfides (PPS), polyether ether ketones (PEEK), poly-p-vinyl phenol resins (PVP polymers), polyamides, polyethylene naphthalate (PEN), polyethylene terephthlate (PET), polyformaldehyde (e.g., "Delurin" produced by du Pont Corp.) polyethylene tetrafluoride, polyethylene trifluoride chloride, polystyrene, methacrylates, polycarbonates (PC) or the like. Meanwhile, the "thermal deformation temperature" means a temperature measured, for example, according to ASTM D-648.

The nickel oxide underlayer can be produced by any of a reactive sputtering method of sputtering a metal (Ni) target on a plastic substrate maintained at a substrate temperature of usually not more than 100° C., a direct production method of directly producing an oxide film from a sintered target composed of an Ni-containing oxide, and a reactive deposition method of depositing a metal (Ni) in an oxygen atmosphere. When the temperature of the substrate is more than 100° C., it is difficult to orient the plane (200) of the nickel oxide film in parallel with the surface of the substrate. The substrate temperature is not particularly restricted as long as it is not more than 100° C., but it is preferred that the substrate temperature be as low as possible in the specified range, i.e., preferably not more than 80° C., more preferably not more than 50° C., still more preferably 10 to 50° C. In particular, such a substrate temperature which can be reached without specific cooling facilities, is advantageous from industrial and economical viewpoints. The lower limit of the temperature is preferably 0° C.

In particular, it is preferred that the plane (200) of the nickel oxide underlayer be predominately oriented in parallel with the surface of the substrate. Here, the "predominant orientation" is defined by a peak area ratio between respective planes measured by an X-ray diffractometer.

In the present invention, the cobalt-containing magnetite thin film whose (400) plane is predominantly oriented in parallel with the surface of substrate, can be produced using a plastic substrate on which is formed a nickel oxide underlayer whose (200) plane is predominantly oriented in parallel with the surface of the substrate, by any of a reactive sputtering method of sputtering a metal target (composed of Fe target and Co metal target, or cobalt-containing iron alloy target) in a mixed gas atmosphere composed of oxygen and a rare gas, a direct production method of directly producing an oxide film from each of a sintered target composed of magnetite $FeO_x \cdot Fe_2O_3$ ($0 < x \leq 1$) and a sintered target composed of cobalt-containing iron oxide, and a reactive deposition method of depositing a metal (alloy composed of Fe and Co) in an oxygen atmosphere. In the reactive sputtering method, in order to obtain the same product even when the deposition speed is raised by increasing an electric power applied, the oxygen partial pressure may also be increased therewith. In the consideration of economy concerning raw materials used, the reactive deposition method and the reactive sputtering method are preferred. Further, in the consideration of less fluctuation in composition during the film production process, the reactive sputtering method is more preferred.

As the rare gases used in the reactive sputtering method of the present invention, there may be exemplified helium, neon, argon, krypton, xenon, radon or the like. In the consideration of the sputtering rate and economy, argon is preferable among these rare gases.

In the reactive sputtering method, there is a tendency that the lower the oxygen partial pressure during the production of the cobalt-containing magnetite thin film, the smaller the spacing of plane (400) of the obtained cobalt-containing maghemite thin film becomes.

The cobalt-containing magnetite may be deposited at a temperature of usually less than 240° C. In the consideration of the heat-resistance of plastic materials used for the substrate, the deposition temperature is preferably not more than 220° C., more preferably not more than 200° C., still more preferably not more than 180° C. The lower limit of the deposition temperature is preferably 0° C.

The time required for depositing the cobalt-containing magnetite may be represented by the value obtained by dividing the thickness of deposited film by the deposition speed.

In the present invention, the cobalt-containing magnetite thin film whose plane (400) is predominantly oriented in the direction parallel with the surface of the substrate, is then oxidized at a substrate temperature of less than 240° C. in a plasma-activated oxygen atmosphere containing a rare gas.

At this time, it is important that the oxidation is conducted at a substrate temperature of less than 240° C. in a plasma-activated oxygen atmosphere containing a rare gas.

As the method of irradiating the plasma-activated oxygen ions, there may be exemplified a method using an ECR microplasma. In addition, the irradiation condition includes an ashing mode and an etching mode. In general, in the ashing mode, an ion beam emitted from a plasma-generating chamber is irradiated onto a substrate while maintaining the ionized state. Therefore, the ashing mode is suitably used for surface-modification treatments. On the other hand, in the etching mode, the ion beam emitted from the plasma-generating chamber neutralizes a space charge using a neutralizer, so that the intensity and amount of the ion beam are increased. Therefore, the etching mode is effective to conduct an etching treatment.

The ion acceleration voltage is preferably −500 to 0 V, more preferably −300 to −100 V. When the ion acceleration voltage is less than −500 V, the thin film may suffer from etching, so that the film thickness becomes decrease or uneven. When the ion acceleration voltage is more than 0 V, the plasma-activated oxygen ion is not irradiated because the electron is emitted. In the present invention, it has been recognized that under such a condition that the thin film remains unremoved, for example, the ion acceleration voltage of not less than −500 V, a similar oxidation-accelerating effect can be obtained by any of the irradiation modes.

In order to increase the amount of plasma generated, it is important to incorporate a rare gas (such as He, Ne, Ar, Kr, Xe or Rn) into a process gas (oxygen) for the purpose of acceleration of the reaction. In the consideration of the effect of accelerating the oxidation of the cobalt-containing magnetite, helium and neon are preferable. As to the amount of the rare gas contained of the oxidation reaction, the percentage of flow rate of the rare gas to that of oxygen is preferably 1 to 90%, more preferably 2 to 75%, still more preferably 3 to 60%. When the rare gas is contained in the above-specified range, the oxygen can be effectively excited.

When the percentage of the rare gas flow rate to the oxygen flow rate is less than 1%, it is difficult to effectively produce an activated oxygen. On the other hand, when the percentage of the rare gas flow rate to the oxygen flow rate is more than 90%, the amount of oxygen required for the oxidation of the cobalt-containing magnetite may be comparatively reduced, so that the oxidation reaction takes a long period of time.

The oxidation temperature is less than 240° C. In the consideration of heat resistance of the plastic substrate and productivity, the oxidation temperature is preferably not more than 220° C., more preferably not more than 200° C., still more preferably not more than 180° C. The lower limit of the oxidation temperature is preferably 0° C.

The perpendicular magnetic film obtained in the process according to the present invention, comprises of a cobalt-containing maghemite thin film (which means a thin film containing a cobalt component in maghemite) formed the nickel oxide underlayer on the surface of the substrate. Such perpendicular magnetic films include not only those obtained by completely oxidizing $Fe^{2+}$ in magnetite thin film into $Fe^{3+}$, i.e., $\gamma\text{-}Fe_2O_3$, but also those in which a slight amount of $Fe^{2+}$ still remains.

In the nickel oxide underlayer of the perpendicular magnetic film obtained in the process according to the present invention, the ratio value of a peak area ($S_{(200)}$) of the plane (200) to a peak area ($S_{(111)}$) of the plane (111) is usually not less than 2 ($S_{(200)}/S_{(111)} \geq 2$). In the consideration of obtaining a good perpendicular magnetic film, the ratio value of the peak area ($S_{(200)}$) of the plane (200) to the peak area ($S_{(111)}$) of the plane (111) is preferably not less than 2.5 ($S_{(200)}/S_{(111)} \geq 2.5$), more preferably not less than 3.0 ($S_{(200)}/S_{(111)} \geq 3.0$).

The nickel oxide underlayer has a thickness of preferably 800 to 3,000 Å, more preferably 1,200 to 2,400 Å, in order to sufficiently accelerate the orientation of plane (400) of the perpendicular magnetic film.

The plane (400) of the cobalt-containing maghemite thin film is predominantly oriented in the direction parallel with the surface of the substrate. Here, the term "predominant orientation" has the same meaning as described above. In the case of the cobalt-containing maghemite thin film, the term means that the ratio value of a peak area ($S_{(400)}$) of the plane (400) to a peak area ($S_{(311)}$) of the plane (311) is usually not less than 2 ($S_{(400)}/S_{(311)} \geq 2$). When the plane (400) of the thin film is not predominantly oriented in the direction parallel with the surface of the substrate, it is not possible to obtain a perpendicular magnetic film.

In the consideration of obtaining a good perpendicular magnetic film, the ratio value of the peak area ($S_{(400)}$) of the plane (400) to the peak area ($S_{(311)}$) of the plane (311) is preferably not less than 2.5 ($S_{(400)}/S_{(311)} \geq 2.5$), more preferably not less than 3.5 ($S_{(400)}/S_{(311)} \geq 3.5$).

The cobalt-containing maghemite thin film has a thickness of usually 0.005 to 1.0 μm, preferably 0.01 to 0.5 μm, more preferably 0.02 to 0.3 μm. When the thickness of the cobalt-containing maghemite thin film is less than 0.005 μm, it is difficult to obtain a magnetic recording medium comprising a cobalt-containing maghemite thin film as a perpendicular magnetic film having a coercive force of not less than 1,000 Oe. On the other hand, when the thickness of the cobalt-containing maghemite thin film is more than 1.0 μm, it is difficult to uniformly magnetize the obtained cobalt-containing maghemite thin film up to a deep portion thereof when signals are recorded thereon, thereby failing to obtain good recording and reproduction characteristics.

The cobalt content in the cobalt-containing maghemite thin film at a molar ratio of Co to Fe is usually 0.005:1 to 0.40:1, preferably 0.01:1 to 0.3:1, more preferably 0.015:1 to 0.15:1. When the molar ratio is less than 0.005:1, it is difficult to obtain a magnetic recording medium having a coercive force as high as not less than 1,000 Oe. On the other hand, when the molar ratio is more than 0.4:1, it is difficult to obtain a magnetic recording medium having an excellent stability independent of change in passage of time.

The cobalt-containing maghemite thin film may further contain at least one element selected from the group consisting of Mn, Ni, Cu, Ti and Zn in order to improve various properties thereof, in such an amount that the molar ratio of these elements to Fe is usually about 0.005:1 to about 0.04:1. Even in this case, the aimed effects of the present invention can be obtained similarly. Especially, in the case where the cobalt-containing maghemite thin film contains Mn, it is possible to obtain a perpendicular magnetic film having a more excellent squareness, specifically a squareness of not less than 0.95.

In the cobalt-containing maghemite thin film of the magnetic recording medium obtained in the process according to the present invention, the spacing of the plane (400) is usually not more than 2.082 Å, preferably not more than 2.080 Å. The lower limit of the spacing of the plane (400) is about 2.055 Å. When the spacing of the plane (400) of the magnetic thin film is more than 2.082 Å, it is difficult to obtain a perpendicular magnetic film.

There is also a close relationship between the spacing of plane and the coercive force of the cobalt-containing maghemite thin film. In the case where the molar ratio of Co to Fe is the same, the smaller the spacing of plane (400), the higher the coercive force becomes.

The magnetic recording medium having the nickel oxide underlayer according to the present invention, has a coercive force of usually 1,000 to 10,000 Oe, preferably 1,500 to 7,000 Oe, more preferably 2,000 to 5,000 Oe, a saturation magnetization (value of magnetization at an applied magnetic field of 15 kOe) of preferably 250 to 400 emu/cm$^3$, more preferably 300 to 360 emu/cm$^3$, and a squareness (value corrected as to demagnetizing field) of usually not less than 0.88, preferably not less than 0.92, more preferably not less than 0.94.

In the present invention, especially when the molar ratio of Co to Fe is 0.04:1, the maximum value of the coercive force was determined to be as high as about 6,900 Oe.

Incidentally, the maximum value of the coercive force of the magnetic recording medium obtained in the process according to the present invention, is a value measurable at an applied magnetic field of 15 kOe by "vibration sample magnetometer VSM" described hereinafter.

The reason why the oxidation temperature in the process according to the present invention can be reduced to the temperature as low as less than 240° C., is considered as follows. That is, since the cobalt-containing magnetite thin film obtained in the process of the present invention cannot be oxidized merely by heat-treating the film at a temperature of less than 240° C. in an atmospheric air, as shown in Comparative Examples hereinafter, it is considered that the oxidation temperature can be reduced to less than 240° C. by irradiating a plasma-activated oxygen ions containing a rare gas onto the cobalt-containing magnetite thin film.

The reason why the high coercive force can be obtained even when the cobalt content is low, and as a result, the wide coercive force range of 1,000 to 10,000 Oe can be obtained, is considered as follows. That is, due to the fact that the aimed magnetic recording medium cannot be obtained in any of the cases where the cobalt-containing maghemite thin film satisfies the specific spacing and the specific peak area ratio but no nickel oxide underlayer is formed; where the nickel oxide underlayer is formed, and the cobalt-containing maghemite thin film satisfies the specific spacing but does not satisfy the specific peak area ratio; and where the nickel oxide underlayer is formed, and the cobalt-containing maghemite thin film satisfies the specific peak area ratio but does not satisfy the specific spacing, the technical advantages of the present invention have been attained by a synergistic effect based on the formation of the nickel oxide underlayer, and the specific spacing and the specific peak area ratio of the cobalt-containing maghemite thin film.

As to the spacing of plane of the cobalt-containing maghemite thin film obtained in the process according to the present invention, even though the same heating temperature is used to transform the cobalt-containing magnetite thin film into the cobalt-containing maghemite thin film, the spacing of the plane (400) of the cobalt-containing maghemite thin film is changed by varying the oxygen flow rate upon production of the cobalt-containing magnetite thin film. Due to this fact, it can be recognized that the change of the spacing is not caused by the difference in thermal expansion coefficient between the substrate and the nickel oxide underlayer or the cobalt-containing maghemite between upon the heat treatment, but is caused by reduction in spacing of the cobalt-containing maghemite thin film itself.

Namely, it is considered that the spacing of the plane (400) of the cobalt-containing maghemite thin film obtained in the process according to the present invention is not more than 2.082 Å which is smaller than the spacing of the plane (200) of the NiO underlayer (2.090 Å), so that a tensile stress is caused in the inward direction of the magnetic thin film whereby an anisotropy can be imparted thereto by the magnetostriction; and that there is caused a synergistic effect based on not only the above anisotropy due to the megnetostriction but also crystal anisotropy due to the addition of Co and shape anisotropy due to the crystal shape, so that a coercive force as high as possible and controllable over a wide range can be obtained even when the cobalt content is low.

The magnetic recording medium obtained in the process according to the present invention is provided with a perpendicular magnetic film which is excellent in oxidation resistance and corrosion resistance, and has a coercive force as high as possible and controllable over a wide range even when the cobalt content is low, can be produced without any limitation to materials for a substrate, and is, therefore, suitable as those for high-density recording.

Further, the magnetic recording medium obtained in the process according to the present invention, especially those having a relatively low coercive force of not more than 3,000 Oe, can be suitably used as those for high-density recording in current magnetic recording systems using a ring-type magnetic head. Whereas, the magnetic recording medium obtained in the process according to the present invention which has a coercive force as high as more than 3,000 Oe, can be expected to be used as those for further high-density recording.

In addition, in the magnetic recording medium obtained in the process according to the present invention, since the heat-treating temperature used for oxidizing the cobalt-containing magnetite thin film into the cobalt-containing maghemite thin film, is as low as less than 240° C., raw materials for the substrate is not required to have a heat resistance, so that plastic materials can be used therefor, resulting in a good productivity and industrial and economical advantages.

EXAMPLES

The present invention is described in more detail by Examples and Comparative Examples, but the Examples are only illustrative and, therefore, not intended to limit the scope of the present invention.

(1) The oxidation of the cobalt-containing magnetite thin film into the cobalt-containing maghemite thin film was determined by observing change in surface resistivity of the thin film which is one of indices thereof.

That is, the surface resistivity of the cobalt-containing magnetite thin film was in the range of 0.001 to 0.5 MΩ, while the surface resistivity of the cobalt-containing maghemite thin film was raised from 1 to 100 MΩ and varied thereover. The surface resistivity was measured by an Insulation Tester DM-1527 (manufactured by Sanwa Denki Keiki Co., Ltd.) by setting the distance between two probes to 10 mm.

(2) The magnetostatic properties such as coercive force and saturation magnetization of the magnetic recording medium, are expressed by values measured by "Vibration Sample Magnetometer VSM" (manufactured by TOEI KOGYO CO., LTD.).

(3) The X-ray diffraction patterns of the thin films are measured by "X-Ray Diffractometer RAD-IIA" (manufactured by RIGAKU DENKI CO., LTD.).

The measuring conditions of the X-ray diffraction patterns are as follow:

lamp used: Fe; lamp voltage: 40 kV; lamp current: 25 mA; sampling width of goniometer: 0.010°; scanning speed: 1.000°/min; light-emitting (divergent) slit: 1°; scattering slit: 1°; light-receiving slit: 0.30 mm.

The region covering a diffraction angle (2θ) of 30.000 to 60.00° was measured under the above-mentioned conditions.

(4) In the X-ray diffraction pattern of a two-layered film composed of the nickel oxide underlayer and the cobalt-containing maghemite thin film, a peak position of the plane (400) of the cobalt-containing maghemite thin film was overlapped on that of the plane (200) of the nickel oxide underlayer because these peak positions were extremely close to each other. Accordingly, in order to obtain a peak area of the plane (400) of the cobalt-containing maghemite thin film, it is necessary to subtract a peak area of the plane (200) of the nickel oxide underlayer from a total peak area of the two-layered film as measured by the X-ray diffraction pattern which is a sum of the peak area of the plane (400) of cobalt-containing maghemite and the peak area of the plane (200) of nickel oxide.

Here, the peak area of the plane (200) of nickel oxide was measured by the following two methods in both of which substantially the same value was obtained.

Method 1:

When the formation of nickel oxide layer was completed, the X-ray diffraction pattern of the nickel oxide layer was measured to obtain a peak area of the plane (200) thereof.

Method 2:

The two-layered film composed of the nickel oxide underlayer and the cobalt-containing maghemite thin film was immersed in a concentrated hydrochloric acid at 80° C. for 30 seconds, and then taken out therefrom, washed with water and dried. Since the nickel oxide is less soluble in acid as compared to the cobalt-containing maghemite, only the cobalt-containing maghemite can be removed by the above treatment. The X-ray diffraction pattern of the thus-obtained film was measured to obtain the peak area of the plane (200) of the nickel oxide.

Also, the spacing of the plane (400) of the cobalt-containing maghemite was obtained from a peak position of the plane (400) in X-ray diffraction pattern of the cobalt-containing maghemite which was obtained by removing the above-measured X-ray diffraction pattern of the nickel oxide underlayer from that of the two-layered film by using a processor unit (manufactured by RINT Corp.). Further, the peak area of the plane (400) may be obtained from such an X-ray diffraction pattern of the cobalt-containing maghemite obtained by the above method.

Example 1

Using a high frequency sputtering apparatus SH-250H-T06 (manufactured by NIPPON VACUUM CO., LTD.), a metal (Ni) target was reactive sputtered by adjusting a distance between a polyimide substrate and the target to 80 mm, at room temperature in a mixed gas atmosphere composed of argon and oxygen under an oxygen partial pressure of 0.15 mTorr and a total pressure of 9 mTorr, thereby depositing an NaCl-type NiO film having a thickness of 200 nm as an underlayer on the polyamide substrate. As a result of the measurement of X-ray diffraction pattern thereof, the obtained NiO film showed a ratio value of a diffraction peak area of the plane (200) to that of the plane (111) of 10.

Further, a cobalt-containing iron alloy target (Fe containing Co of 4 wt. %) was sputtered on the obtained NiO film at a substrate temperature of 180° C. in a mixed gas atmosphere composed of argon and oxygen under an oxygen partial pressure of 0.23 mTorr and a total pressure of 9 mTorr, thereby depositing a cobalt-containing magnetite thin film having a thickness of 60 nm and containing cobalt at a molar ratio of Co to Fe of 0.04:1, on the Nio film formed on the polyimide substrate.

The obtained cobalt-containing magnetite thin film had a surface resistivity of 0.07 MΩ. Incidentally, the electric power applied was 300 W.

As a result of the measurement of the X-ray diffraction pattern of the obtained cobalt-containing magnetite thin film, it was determined that the ratio value of a diffraction peak area of the plane (400) to that of the plane (311) was 14, and the plane (400) was predominantly oriented in parallel with the surface of the substrate.

The obtained two-layered film was oxidized by irradiating with plasma-activated oxygen ions under a total gas pressure of $3 \times 10^{-4}$ Torr in an oxygen atmosphere containing helium (percentage of helium gas flow rate to oxygen flow rate: 50%) at a substrate temperature of 180° C., at a microwave power of 100 W, at an ion acceleration voltage of −150 V for 30 minutes by using an Electron Cyclotron Resonance (ECR)-type ion shower apparatus "EIS-200ER" (manufactured by ELIONIX CO., LTD.). The obtained thin film had a surface resistivity of 15 MΩ, and was, therefore, determined to be a cobalt-containing maghemite formed on the NiO underlayer.

As a result of the measurement of X-ray diffraction pattern of the obtained magnetic recording medium, it was determined that the ratio value of a diffraction peak area of the plane (400) to that of the plane (311) was 10, and the plane (400) was predominantly oriented in parallel with the surface of the substrate. The spacing of the plane (400) was 2.080 Å.

The magnetostatic property of the magnetic recording medium was measured, so that the saturation magnetization thereof was 325 emu/cm$^3$, the coercive force thereof was 2,900 Oe, the squareness after being corrected as to demagnetizing field was 0.94, and the perpendicular anisotropic field was 10,000 Oe. Therefore, it was recognized that the film was a good perpendicular magnetic film.

Examples 2 to 5 and Comparative Examples 1 to 4

The same procedure defined in Example 1 was conducted except that kind of the plastic substrate, substrate temperature, film thickness and orientation upon forming the nickel oxide underlayer, substrate temperature upon production of the cobalt-containing magnetite thin film, and substrate temperature, kind of the rare gas, percentage of rare gas flow rate to oxygen flow rate and irradiation time upon oxidation of the magnetite thin film were varied, thereby obtaining magnetic recording media.

The production conditions and various properties are shown in Tables 1 and 2.

Incidentally, in Example 2 and Comparative Example 4, no diffraction peak was observed with respect to the (311) plane of the cobalt-containing magnetite thin film. Further, in Example 2 and Comparative Example 4, no diffraction peak was observed with respect to the (311) plane of the cobalt-containing maghemite thin film.

Incidentally, in Comparative Example 2, the cobalt-containing magnetite thin film was treated in an atmospheric air instead of the plasma-activated oxygen atmosphere containing the rare gas. However, the cobalt-containing magnetite thin film was not oxidized and remained as magnetite even after the treatment.

TABLE 1

| Examples and Comparative Examples | Nickel oxide underlayer | | | |
|---|---|---|---|---|
| | Substrate used | Substrate temperature (° C.) | Thickness (mm) | $S_{(200)}/S_{(111)}$ value |
| Example 2 | Polyimide | 25 | 200 | 20 |
| Example 3 | Polyamide | 25 | 100 | 4 |
| Example 4 | PC | 25 | 100 | 20 |
| Example 5 | Polyimide | 25 | 100 | ∞ |
| Comparative Example 1 | Polyimide | — | — | — |
| Comparative Example 2 | Polyimide | 25 | 200 | 10 |
| Comparative Example 3 | Polyamide | 120 | 100 | 1 |
| Comparative Example 4 | PC | 25 | 100 | 20 |

TABLE 1-continued

| Examples and Comparative Examples | Production of cobalt-containing magnetite thin film Substrate temperature (° C.) | Cobalt-containing magnetite thin film Surface resistivity (MΩ) | Cobalt-containing magnetite thin film Cobalt content (molar ratio of Co:Fe) |
|---|---|---|---|
| Example 2 | 200 | 0.10 | 0.04:1 |
| Example 3 | 200 | 0.07 | 0.02:1 |
| Example 4 | 150 | 0.09 | 0.28:1 |
| Example 5 | 200 | 0.30 | 0.01:1 |
| Comparative Example 1 | 200 | 0.01 | 0.04:1 |
| Comparative Example 2 | 200 | 0.009 | 0.04:1 |
| Comparative Example 3 | 200 | 0.008 | 0.02:1 |
| Comparative Example 4 | 150 | 0.011 | 0.003:1 |

| Examples and Comparative Examples | Cobalt-containing magnetite thin film Mn content (molar ratio of Mn:Fe) | Peak area ratio $S_{(400)}/S_{(311)}$ value |
|---|---|---|
| Example 2 | 0:1 | ∞ |
| Example 3 | 0.005:1 | 9 |
| Example 4 | 0:1 | 4 |
| Example 5 | 0:1 | 9 |
| Comparative Example 1 | 0:1 | 0.2 |
| Comparative Example 2 | 0:1 | 14 |
| Comparative Example 3 | 0:1 | 1.5 |
| Comparative Example 4 | 0:1 | ∞ |

| Examples and Comparative Examples | Oxidation treatment Substrate temperature (° C.) | Kind of rare gas | Percentage of rare gas flow rate to oxygen flow rate (%) | Irradiation time |
|---|---|---|---|---|
| Example 2 | 150 | He | 60 | 30 min. |
| Example 3 | 180 | He | 50 | 1 min. |
| Example 4 | 150 | He | 50 | 10 sec. |
| Example 5 | 150 | He | 50 | 30 sec. |
| Comparative Example 1 | 180 | He | 60 | 1 min. |
| Comparative Example 2 | 180 | — | — | 60 min. |
| Comparative Example 3 | 150 | He | 50 | 1 min. |
| Comparative Example 4 | 150 | He | 40 | 10 min. |

TABLE 2

| Examples and Comparative Examples | Magnetic thin film Composition | Cobalt content (molar ratio of Co:Fe) | Mn content (molar ratio of Mn:Fe) |
|---|---|---|---|
| Example 2 | cobalt-containing maghemite | 0.04:1 | 0:1 |
| Example 3 | Co and Mn-containing maghemite | 0.02:1 | 0.005:1 |
| Example 4 | cobalt-containing maghemite | 0.28:1 | 0:1 |
| Example 5 | cobalt-containing maghemite | 0.01:1 | 0:1 |
| Comparative Example 1 | cobalt-containing maghemite | 0.04:1 | 0:1 |
| Comparative Example 2 | cobalt-containing magnetite | 0.04:1 | 0:1 |
| Comparative Example 3 | cobalt-containing maghemite | 0.02:1 | 0:1 |
| Comparative Example 4 | cobalt-containing maghemite | 0.003:1 | 0:1 |

| Examples and Comparative Examples | Magnetic thin film Thickness (nm) | Surface resistivity (MΩ) | Spacing of plane (400) (Å) | Peak area ratio value: $S_{(400)}/S_{(311)}$ |
|---|---|---|---|---|
| Example 2 | 60 | 18 | 2.066 | ∞ |
| Example 3 | 60 | 15 | 2.078 | 7 |
| Example 4 | 20 | 28 | 2.082 | 3 |
| Example 5 | 20 | 35 | 2.069 | 6 |
| Comparative Example 1 | 20 | 19 | 2.077 | 0.2 |
| Comparative Example 2 | 60 | 0.009 | 2.096 | 14 |
| Comparative Example 3 | 20 | 17 | 2.075 | 1 |
| Comparative Example 4 | 20 | 18 | 2.072 | ∞ |

| Examples and Comparative Examples | Magnetic thin film Saturation magnetization (emu/cm³) | Coercive force (Oe) | Squareness (corrected as to demagnetizing field) | Perpendicular anisotropic field (Oe) |
|---|---|---|---|---|
| Example 2 | 305 | 6,900 | 0.91 | 24,000 |
| Example 3 | 335 | 1,620 | 0.96 | 6,800 |
| Example 4 | 330 | 6,770 | 0.9 | 23,000 |
| Example 5 | 330 | 2,010 | 0.92 | 7,900 |
| Comparative Example 1 | Longitudinal recording medium | | | |
| Comparative Example 2 | Longitudinal recording medium | | | |
| Comparative Example 3 | Longitudinal recording medium | | | |
| Comparative Example 4 | 340 | 820 | 0.8 | 2,600 |

What is claimed is:

1. A process for producing a magnetic recording medium, comprising:

forming on a plastic substrate, a nickel oxide underlayer having a plane (200) which is predominantly oriented in parallel with the surface of the plastic substrate;

forming on the nickel oxide underlayer, a cobalt-containing magnetite thin film having a plane (400) which is predominantly oriented in parallel with the surface of the plastic substrate, at a substrate temperature of less than 240° C.; and oxidizing the obtained cobalt-containing magnetite thin film in a plasma-activated oxygen atmosphere containing a rare gas at a substrate temperature of less than 240° C. incorporating the rare gas into oxygen, to produce a cobalt-containing maghemite thin film as a perpendicular magnetic film having a spacing of a plane (400) of not more than 2.082 Å.

2. A process according to claim 1, wherein the temperature of the plastic substrate upon the formation of the nickel oxide underlayer is not more than 100° C.

3. A process according to claim 1, wherein the percentage of flow rate of the rare gas to that of oxygen in the oxidation reaction is 1 to 90%.

4. A process according to claim 1, wherein the substrate temperature in the oxidation of the cobalt-containing magnetite thin film in a plasma-activated oxygen atmosphere is 0 to 220° C.

* * * * *